(12) United States Patent
Collart

(10) Patent No.: US 10,796,083 B2
(45) Date of Patent: Oct. 6, 2020

(54) WIRELESS DEVICE PORTAL APPLICATION IMPLEMENTING A PLURALITY OF TRUNCATED APPLICATIONS

(71) Applicant: TracFone Wireless, Inc., Miami, FL (US)

(72) Inventor: Daniel Collart, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 342 days.

(21) Appl. No.: 14/626,368

(22) Filed: Feb. 19, 2015

(65) Prior Publication Data
US 2015/0234803 A1    Aug. 20, 2015

Related U.S. Application Data

(60) Provisional application No. 61/941,757, filed on Feb. 19, 2014.

(51) Int. Cl.
| | |
|---|---|
| *G06F 40/174* | (2020.01) |
| *H04L 29/08* | (2006.01) |
| *G06F 9/451* | (2018.01) |
| *G06F 3/0484* | (2013.01) |

(52) U.S. Cl.
CPC ........ *G06F 40/174* (2020.01); *G06F 3/04847* (2013.01); *G06F 9/451* (2018.02); *H04L 67/02* (2013.01); *H04L 67/04* (2013.01); *H04L 67/125* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 8,751,535 | B1* | 6/2014 | Kim ................. | G06F 17/30029 707/784 |
| 2008/0215998 | A1* | 9/2008 | Moore ............... | G06F 9/4443 715/762 |
| 2008/0307335 | A1* | 12/2008 | Chaudhri ........... | G06F 3/0482 715/764 |
| 2011/0055593 | A1* | 3/2011 | Lurey ................ | G06F 21/31 713/193 |
| 2014/0129438 | A1* | 5/2014 | Desai ................ | G06Q 20/08 705/41 |

* cited by examiner

*Primary Examiner* — Stella Higgs
(74) *Attorney, Agent, or Firm* — BakerHostetler

(57) ABSTRACT

The invention describes a process and system for improving user experience with web-based applications on an electronic device. In particular, instructions are provided for one or more truncated applications that may be stored in memory of the electronic device. Icons associated with the one or more truncated applications are caused to be displayed on the electronic device. It is further determined that a user has selected at least one of the truncated applications. Thereafter, user input fields of the selected one or more truncated application is populated with user information.

20 Claims, 7 Drawing Sheets

WIRELESS DEVICE PORTAL APPLICATION IMPLEMENTING A PLURALITY OF TRUNCATED APPLICATIONS

CROSS REFERENCE TO PRIOR APPLICATIONS

This application claims the benefit from U.S. Provisional Application No. 61/941,757 filed on Feb. 19, 2014, which is hereby incorporated by reference for all purposes as if fully set forth herein.

BACKGROUND OF THE DISCLOSURE

1. Field of the Disclosure

This application generally relates to a process, device, and system for improving user interaction with web-based applications located on an electronic device. This application also relates to a computer program product for improving user interaction with web-based applications located on an electronic device.

2. Related Art

In the last decade, significant technological advances have been made in the field of hand-held electronic devices including but not limited to mobile phones, tablets and personal digital assistants. In particular, mobile phones, specifically smartphones, have the capability to browse internet web pages using HTML and HTTP. While smartphones can perform almost any task a desktop computer can perform regarding web-browsing, the smartphone's size constraints limit its memory and processing speed. For example, a web browser generally employs cache to store HTML source code and images which consumes memory and processor resources. The graphics on the web pages are primarily designed for desktop and laptop computers having sufficient memory and processor resources.

Users are becoming increasingly conscious of their smartphone purchases in view of its processing limitations. With dozens of new smartphones being launched every year, users are carefully comparing features such as memory, pre-installed, web-based applications, speed and security. By so doing, the user expects an enjoyable experience with their smartphone to conduct various functions including but not limited to sending/receiving phone calls, browsing the web, and a plurality of tasks previously achieved only by desktop or laptop computers.

As readily understood by those skilled in the art, pre-loaded applications take up memory on smartphones. The more memory necessary to store pre-loaded applications on smartphones, the less memory therefore is available for a user to employ for personal use. What is desired is a process and system employed on a smartphone that reserves less memory for pre-loaded applications.

Inputting credentials into desired, pre-loaded applications is time consuming. This input step, by itself, may cause some users to become frustrated and ultimately forgo using the pre-loaded application. Namely, credentials generally are input using the smartphone's tiny keyboard. What is desired is a faster means for signing up for applications.

Security of user information while accessing web-based applications is important to users. Since cyber theft has been growing over the past few years, it is desired to have a secure platform for inputting user information into web-based applications.

SUMMARY OF THE INVENTION

One aspect of the application provides a method for improving user experience with web-based applications on an electronic device. One of the steps involves providing instructions for one or more truncated applications for storage in memory of the electronic device. Another step involves displaying icons representing said one or more truncated applications on a display of said electronic device. Yet another step involves determining that a user has selected at least one of said truncated application. A further step involves populating user input fields of said selected one or more truncated applications with user information.

In another aspect of the application, there is described a system. The system improves user interaction of web-based applications on an electronic device. The system includes memory on the electronic device having stored instructions for one or more truncated applications. The system also includes a processor on the electronic device that is operatively coupled to the memory. The processor is configured to perform the instruction involving at least displaying icons representing said one or more truncated applications on a display of said smartphone device. The instructions also involve determining when at least one of said truncated applications has been selected by a user. The instructions further involve populating user input fields of the selected one or more truncated applications with user information.

In yet another aspect of the application, there is disclosed a non-transitory, computer readable medium that includes instructions for improving user experience with web-based applications.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

DETAILED DESCRIPTION

Figure 1:
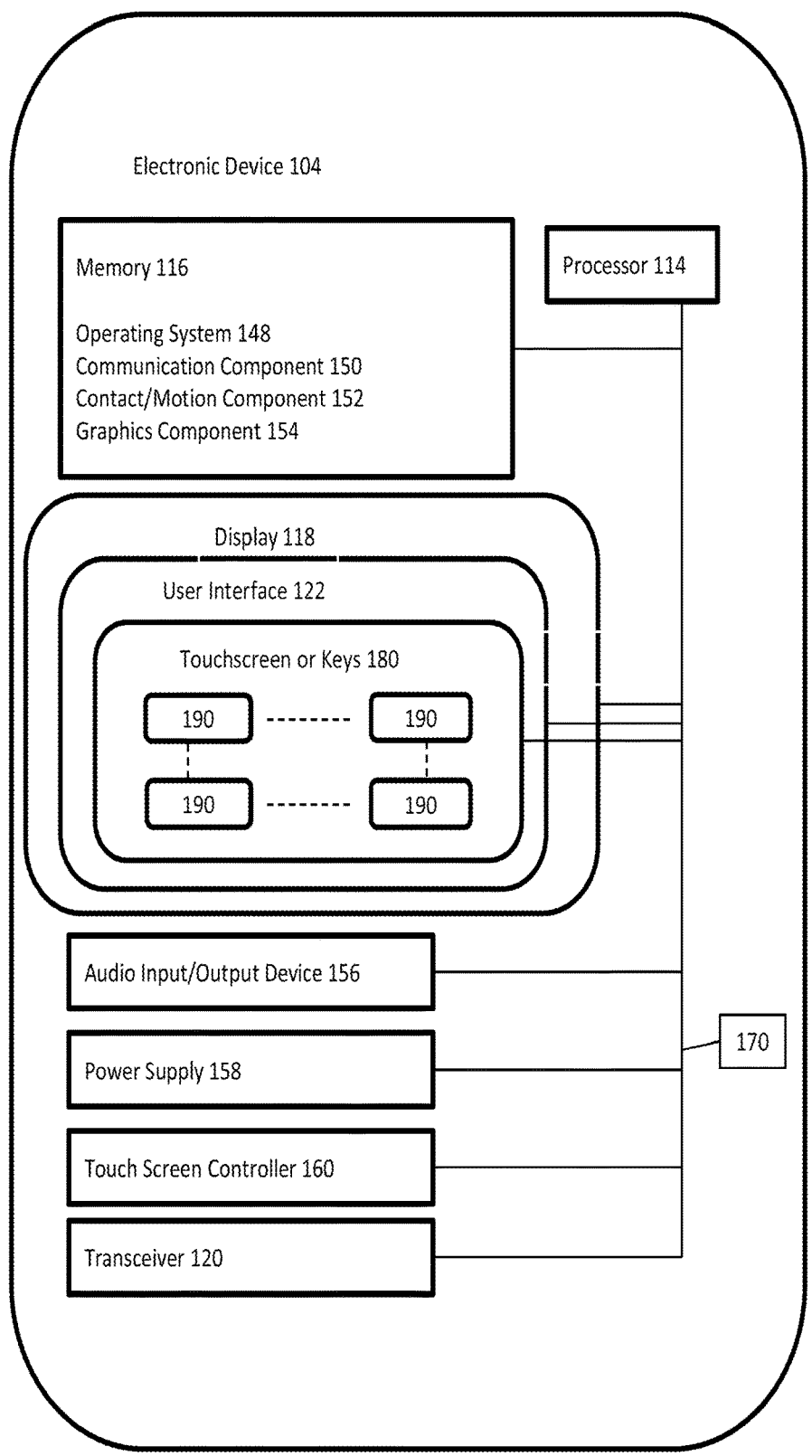
FIG. 1 illustrates a wireless device according to one aspect of the invention.

As an initial matter, reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

It is to be understood that the system modules and method steps described in this application may be employed in various forms of hardware, software, firmware, special purpose processors or a combination thereof. The application in one aspect is directed to a process and system utilizing a software application comprising executable code that is operably stored on one or more program storage devices including but not limited to a magnetic floppy disk, RAM, ROM, CD ROM and/or Flash memory.

In one aspect, the software application is employed for mobile application platforms. In one aspect, the software is a smart phone application. In another aspect, the mobile application functions as a portal application enabling a secure platform for users to navigate. In yet another aspect, the software application is configured to interface with one or more truncated applications. In one aspect, the truncated applications use less memory than their standard application counterparts. These standard applications generally are obtained at web stores including but not limited to the Apple Store and Google Play Store. In a particular aspect, the truncated applications have limited functionality and interact with a separate processor to provide increased functionality.

In an exemplary aspect, the truncated applications (Apps) may include but are not limited to the following categories of applications, such as, for example Calculate/Utilities applications, entertainment applications, Games applications, News applications, Productivity applications, Search tool applications, Social networking applications, Sports applications, Travel Applications, and Weather applications.

For example, Calculate/utilities applications provide various ways in which calculate desired values. For example, Calculate/utilities applications show you how much your mortgage payment will be, how to convert temperatures, how to calculate square footage, estimate your auto loan monthly payments, find international calling codes for each country and more. The Calculate/utilities applications are intended to make life easier.

For example, Entertainment applications primarily are intended to inform users of the latest celebrity gossip, show users how to play a variety of games and even make sounds, such as for example, bird noises, and the like.

For example, Games applications primarily are intended for amusement. Users can play Sudoku, shoot helicopters, jump over craters, or even simulate what mixed drinks would taste like for a bartender in Training, and the like.

For example, News applications primarily are intended for users wanting to receive the latest information about a certain subject of interest. The news applications may include health, science, environment, sports, finance, politics, world news, etc. The news is delivered real-time, so the user may stay abreast of current events.

For example, Productivity applications primarily are intended to track spending and managing bank accounts, allow for document processing, provide calendars, and the like. These applications help manage everyday tasks to make life easier in the long term. Other examples include applications which consolidate all information into one channel. One example, in particular, is EverNote.

For example, Search tool applications are primarily intended to search for specific and random subject matter. For example, the application may find currency prices around the world. In addition, the application may determine international phone codes. This application also is useful for obtaining cooking recipes.

For example, Social networking applications may include chat and text forums to catch up with friends, family and acquaintances from around the world. The applications may include a city guide to explain the sights and dining of a new city such as Yelp and Open Table.

For example, Sports Applications are primarily intended for sports fans who want the latest headlines in their favorite sport.

For example, Travel applications primarily are intended for those users who will be travelling to ensure the most accurate maps are available. The applications are also good to ensure specific landmarks and restaurants are present at the location a pre-dated books said it is.

For example, Weather applications provide users with a forecast of the weather for the current day, 36 hours, week or 10 day extended forecast. The application may also provide ski reports and other indicators such as smog and air quality.

In an exemplary aspect, the truncated applications employed by the mobile application are selected based upon independent market research. Namely, the most popular truncated applications on the market are assessed and categorized. Alternatively, the most popular truncated applications based upon a category are assessed and categorized. Even further, the most popular truncated applications based upon demographics including but not limited to gender, age, race and religion are assessed and categorized.

In a further exemplary aspect, the applications may be derived from servers which maintain inventories of applications for purchase and download. Examples include the iPhone Apple Store, Blackberry's RIM Store, Nokia's OVi Store, Google play, Android store, Verizon Wireless V-CAST Store and the like.

The mobile application described in this application is executable by any electronic device including but not limited wireless devices, mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

FIG. 1 illustrates an exemplary electronic device which may be employed in many aspects of this application. The electronic device 104 includes a processor 114, memory 116, display 118, user interface 122, a power supply 158, and the like. The processor 114 may be a central processing unit configured to execute instructions, such as, for example instructions related to software programs.

The display 118 may be a liquid crystal display having a backlight to illuminate the various color liquid crystals to provide a colorful display. The user interface 122 may be any type of physical input having buttons and further may be implemented as a touchscreen 180.

The electronic device 104 may further include in the memory 116, an operating system 148, a communication component 150, a contact/motion component 152, a graphics component 154 and the like. The operating system 148 together with the various components providing software functionality for each of the components of the electronic device 104. The electronic device 104 may further include a touchscreen controller 160.

The memory 116 may include a high-speed random-access memory. Also, the memory 116 may be a non-volatile memory, such as magnetic fixed disk storage, flash memory or the like. These various components may be connected through various communication lines including a data bus 170.

Additionally, the electronic device 104 may include an audio input/output device 156. The audio input/output device 156 may include speakers, speaker outputs, and the like, providing sound output; and may include microphones, microphone inputs, and the like, for receiving sound inputs. The audio input/output device 156 may include and analog to digital converter and a digital to audio converter for audio input and output functions respectively.

When implemented as a wireless device, the electronic device 104 may include a transceiver 120 and the like. The electronic device 104 may provide radio and signal processing as needed to access a network for services. The processor 114 may be configured to process call functions, data transfer, and the like and provide other services to the user.

In one aspect, the touchscreen 180 of the invention may be implemented in the display 118 and may detect a presence and location of a touch of a user within the display area. For example, touching the display 118 of the electronic device 104 with a finger or hand. The Touchscreen 180 may also sense other passive objects, such as a stylus.

In operation, the display 118 may display various objects 190 associated with applications for execution by the processor 114. In this regard, a user may touch the display 118, and in particular the touchscreen 180, to interact with the objects 190. For example touching an object 190 may execute an application in the processor 114 associated with the object 190 that is stored in memory 116. Additionally or alternatively, touching an object 190 may open a menu of options to be selected by the user. The display 118 may include a plurality of the objects 190 for the user to interact with. Moreover the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The touchscreen 180 is generally configured to display a graphical user interface (GUI) that provides an easy to use visual interface between a user of the electronic device 104 and the operating system or application(s) running on the mobile device. Generally, the GUI presents programs, files and operational options with graphical images. During operation, the user may select and activate various graphical images displayed on the display in order to initiate functions and tasks associated therewith.

The customization of the interface aspects may be based on the use of the electronic device 104 by the user. The use may include how the user uses the touchscreen 180, which objects 190 are used, how often the objects 190 are used and how the user physically touches the touchscreen 180.

In another aspect according to the application, there is described a process for improving user interaction with web-based applications. A truncated version of the web-based applications are stored and launched via an electronic device such as, for example, as illustrated in FIG. 1.

In an exemplary aspect, the instructions, i.e., code, for a master application are stored locally in the memory of an electronic device. The master application serves as an interface to a plurality of truncated applications also stored in the memory of the electronic device. Truncated applications are abbreviated versions of their full memory counterparts. That is, truncated applications lack some of the features of the full memory version of the application.

Alternatively or additionally, the master application functions as a portal application. One of the main purposes of the portal application is to meet a specific user need and utilize the user's profile to derive their personal information and/or preferences. Another purpose of the portal application is for the service provider, such to control and track activity once the user has logged into the system. In one aspect, the service provider is a MVNO. By tracking usage, the service provider is placed in a better position to evaluate if and when specific truncated applications are subscribed to by the user.

Figure 2:
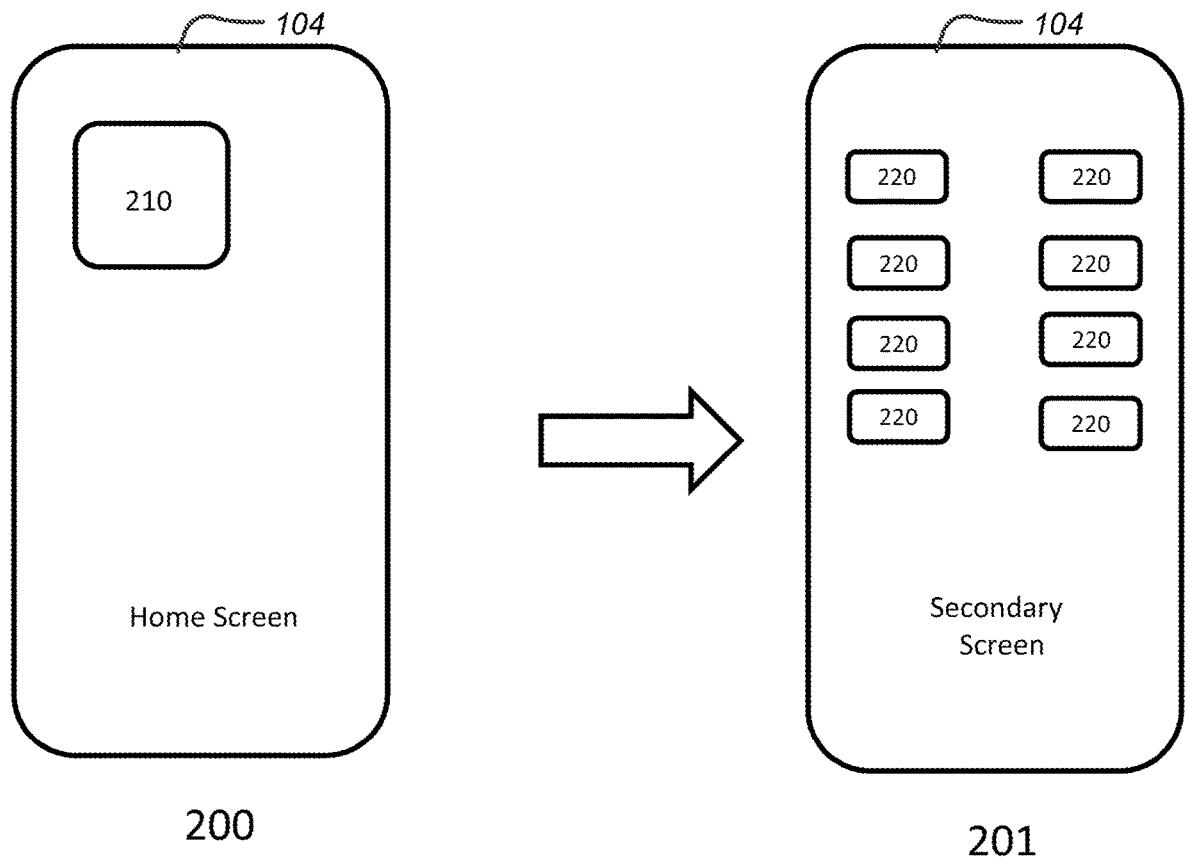
FIG. 2 illustrates an initial screen containing the master application and a secondary screen containing the truncated applications according to one aspect of the invention.

FIG. 2 illustrates an initial screen containing the master application and a secondary screen containing the truncated applications according to one aspect of the invention. According to an exemplary aspect, an icon 210 representing the master application is displayed on a home screen 200 of FIG. 2 the electronic device 104. In one aspect, the electronic device is a hand-held device. In one aspect, the hand-held device is a smartphone. In one aspect, the smartphone communicates with a network via a subscription service paid directly to a MVNO.

Alternatively, the master application may be displayed on a second or subsequent screen. That is, the master application may be accessible under a subdirectory of an application displayed on the home screen. For example, the master application may be located under a main directory titled "Applications" that is located on a home screen. Other applications, such as for example, a GMAIL app, may also be found in the main directory, e.g., same level, as the master application described above in this application.

Also shown in FIG. 2 is a secondary screen 201. The secondary screen displays each of the truncated applications 220 accessible to the user. Access to the secondary screen 201 is gained by executing the icon 210 associated with the master application. This aspect will be discussed in further detail below.

In another exemplary aspect, the master application may be selected by a user. In one aspect, the master application utilizes application program interface (API) protocol, e.g., rules, which allow the master application to interface and/or communicate with one or more of the truncated applications. Generally, an API is a set of programming instructions and standards for accessing a web-based software application or web tool. An API is a software-to-software interface, not a user interface. That is, with APIs, applications talk to each other without any user knowledge or intervention. A software company releases its API to the public so that other software developers can design products that are powered by its service.

In an exemplary aspect, the software stored in the memory including code that is associated with the master application to determine if and when at least one of the truncated applications has been selected by a user of the electronic device, e.g., smartphone. Selection of the truncated application may be performed by directly tapping on the truncated application. Alternatively, if the icons are displayed in folder format, the desired application may be accessed by selecting the folder associated with the application for execution.

Once one or more of the truncated applications are executed, the user generally is directed to a sign-on screen thereof. The sign-on screen requests specific information from the user to gain full access to the truncated application. For example, the truncated application may request the user's name, address and date of birth. The truncated applications may also ask for information such as answers to common security questions found on popular websites, e.g., banking websites. For example, the security questions may include but are not limited to the following: (i) What is your mother's maiden name; (ii) What city were you born in; (iii) What is the make and model of your first car; (iv) What is your high school mascot. The security questions help ensure user privacy guidelines are being followed.

In one aspect, all of the truncated applications are free mobile applications. In another aspect, all of the truncated applications are paid-for mobile applications. In yet another aspect, the truncated applications are a combination of free and paid-for mobile applications. For paid-for mobile applications, further credentials may be necessary. For example, credit card information or bank account information may need to be provided. In addition, driver's license identification may be requested to verify credit card information.

In an exemplary aspect, the software associated with the master application may communicate with a database including the user's credentials. The database may include user information including but not limited to the user's name, address, date of birth, social security number etc. to populate user input fields for each of the selected one or more truncated applications.

The database may be stored in the memory of the electronic device in a separate location or subdirectory from the master application. Alternatively, the database may be located within a subdirectory of the master application. The master application may utilize application programming interface (API) protocol to communicate between the database and input fields for each of the one or more truncated applications. The instructions for the one or more truncated applications may include one or more algorithms specifically written to implement each of the functions. Once communication is achieved, the user input fields are automatically populate. In one particular aspect, the database may be encrypted. In this regard, encryption may be based on a symmetric key scheme or based on a public key encryption scheme. In a particular aspect a symmetric-key scheme may be utilized such that the encryption and decryption keys are the same. Thus the user must have the same key before they can achieve access the database.

In an exemplary aspect, the user may be prompted by the master application to 'agree' or 'not agree' to the automatic population of the user input fields with the user's credentials. Generally, the user will agree as automatic population speeds up the time required for the user to access the software. Otherwise, the user would have to manually enter his or her credentials for every application desired. Given the size constrains of typical keyboards on phones, users are prone to making typographical errors.

In yet a further exemplary aspect, the user is automatically logged into the one or more applications. Alternatively, the user may be prompted to check the automatic credentials input into each of the fields displayed on the electronic device. The user then accepts or declines the input information depending upon the accuracy. If the user declines, the user is given the opportunity to correct any line of the user input manually. For example, the mailing address of the user may automatically populate with a phrase that the user wishes to change. Perhaps the user has recently moved, or prefers to input a business address as the primary address.

In yet even a further exemplary aspect, users may access a web portal to demand access information regarding one or more mobile devices. In one implementation, device management system includes a web or HTML/HTTP-based interface that provides various page views to users associated with mobile devices. Each user may be associated with a user profile object, which is a data object maintained in one or more data stores that includes various attributes of a user. In one aspect, the user profile data may be maintained in a Lightweight Directory Access Protocol (LDAP) directory. In one aspect, a user profile object may contain user identifying information such as full legal name, username (for login access to various systems), email address information, domain components (dc), telephone numbers, office locations, organizational information (such as department or group identifiers of an enterprise, reporting structure information, job title, etc.), authentication information, and mobile device profile information (or pointers to device profile data objects). A given user profile data object can include mobile device profile information for more than one mobile device. Such mobile device information may include model identifiers, operating system and version, mobile device telephone number, serial numbers, MAC addresses, and specifications (e.g., storage capacity, display size, and the like). In addition, group or department objects can be configured to define one or more attributes that are common to a group or department within an enterprise, such as an engineering or sales department (enterprise-wide or regionally). Furthermore, some groups can be linked as sub-groups to other larger group designations. A user profile data object can be linked to one or more of these groups (either directly or by inheritance). For example, a salesperson may be linked to a "West Coast Sales Team Group," which is a sub-group of a "Sales Division" of a given enterprise.

Figure 3:
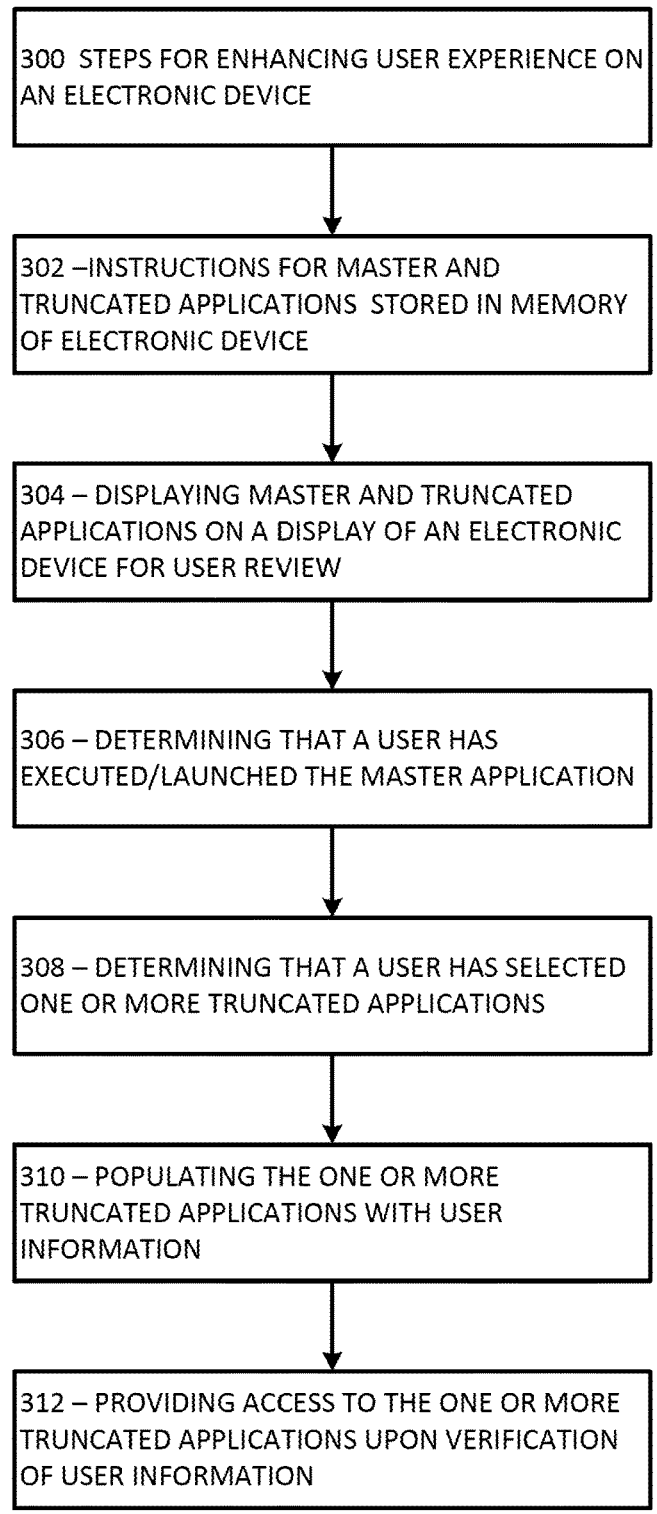
FIG. 3 illustrates exemplary steps for enhancing user experience on an electronic device.

FIG. 3 illustrates exemplary steps for enhancing user experience on an electronic device. As shown in FIG. 3, there an exemplary hierarchy chart is disclosed showing application software 300 employed for enhancing user experience on an electronic device 104. Box 302 illustrates instructions wherein for master applications and truncated applications are stored in the memory of an electronic device. Box 304 illustrates instructions wherein master applications and truncated applications are displayed on a display of an electronic device for user review. Box 306 illustrates instructions wherein a determination is made when a user has launched/executed the master application. Box 308 illustrates instructions wherein a determination is made when a user has selected one or more truncated applications which will require gaining access to prior to navigation by the user. Box 310 illustrates instructions wherein user information and/or credentials is transmitted from a database, either locally or non-locally, to each of the selected one or more truncated applications. Lastly, upon verification by the software that all of the user fields have been accurately completed, the user is provided access 312 to the selected one or more truncated applications.

Figure 4:
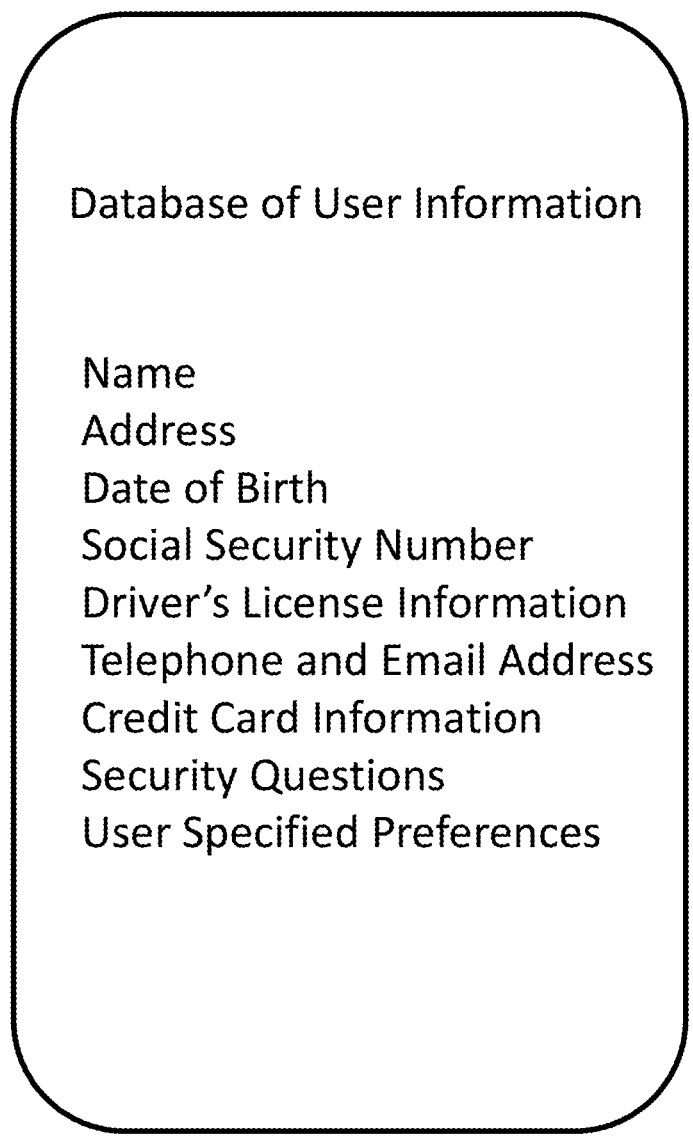
FIG. 4 illustrates a database including a user's credentials according to one aspect of the invention.

FIG. 3 illustrates a database including a user's credentials according to one aspect of the invention. In another exemplary aspect, a database which stores user information is illustrated in FIG. 4. The user information illustrated in FIG. 4, is exemplary, and may include further information as required by the service provide and/or web application. For example, the database may include information such as full name, address, date of birth, social security number, driver's license state and number, email address, contact number and credit card information. In a further exemplary aspect, the database may include security questions. In yet another further exemplary aspect, the database may include user specified preferences. Such user preferences may include but is not limited to prompts which forgo transmission of information that is not mandatory or required by the specific truncated application. For example, certain truncated applications do not require email addresses or middle names. A user may opt not to provide such information to prevent email solicitations or to preserve personal security preferences.

The database illustrated in FIG. 4 may be accessible through the master application. That is, the credentials are maintained on the master application which serves as a portal application with security profiles commonly known in the art, such as for example, on banking institutional websites. Alternatively, the database illustrated in FIG. 4 may be located in a separate application stored in the memory of the electronic device. The database may be accessed by the master application and used to populate the selected one or more truncated applications. In one aspect, the master application may communicate with the one or more truncated applications utilizing API protocol.

Figure 5:
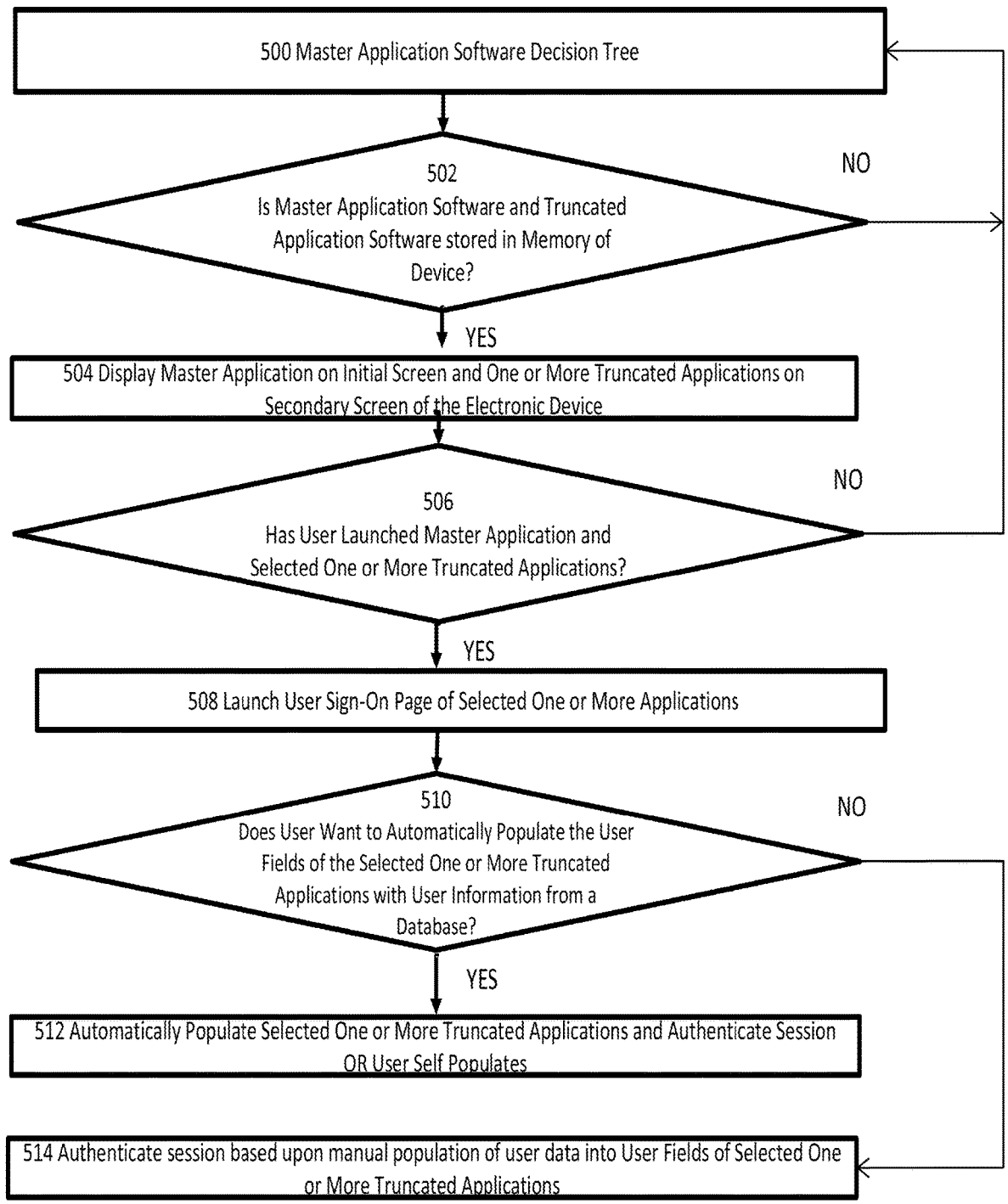
FIG. 5 illustrates a decision tree for the software program employed for enhancing user experience on an electronic device according to one aspect of the invention.

FIG. 5 illustrates a decision tree for the software program employed for enhancing user experience on an electronic device according to one aspect of the invention. FIG. 5 illustrates a process 500 to be employed by the software program of the master application. The first decision box 502 of the software is to assess whether the master application and the truncated application software is located in the memory of the device. According to 504, if the software concludes in the affirmative, the master application will be displayed on the initial screen. The initial screen may be the home screen. Alternatively, the initial screen may be located under the applications tab. In addition, the one or more truncated applications will be displayed on a secondary screen. In an exemplary aspect, the secondary screen directly follows the initial screen which displays the master application. If the software program concludes in the negative, the process is returned to process 500.

Next, the software program inquires whether the user has launched the master application in 506 and whether any of the one or more truncated applications has been selected by the user. If the software program concludes in the affirmative, the sign-on page of the selected one or more truncated programs is launched. In step 508, if the software program concludes in the negative, the process is returned to process 500.

The software program then inquires whether the user would like to automatically populate 510 the user input fields of the selected one or more truncated applications with predefined user input information stored in database. The predefined user input information may include but in not limited to the user's name, address, date of birth, social security number etc. to populate user input fields for each of the selected one or more truncated applications. The input information may include credit card information. The input information may further include answers to security questions. If the user accepts, the software program auto populates the user input fields with predefined user info for the selected one or more truncated applications in step 512. If, on the other hand, the user declines, the software program does not auto populate and the user is required to manually complete the user input fields for the selected one or more truncated applications in step 514.

In yet another aspect of the invention in this application, there is disclosed a system for improving user interaction with web-based applications stored and executed on an electronic device. In one aspect, the electronic device is a smartphone device. In one aspect, the smartphone device includes a memory which stores instructions for a master application including one or more truncated applications. The smartphone device also includes a processor. The processor is operatively coupled to the memory, e.g., data storage unit. The processor executes the master application stored on the memory. The code of the master application is configured to perform the steps of: (i) displaying icons representing said master application and said one or more truncated applications on a display of said smartphone device; (ii) determining when at least one of said truncated applications has been selected by a user; and (iii) populating user input fields of said selected one or more truncated applications with user information.

Figure 6:
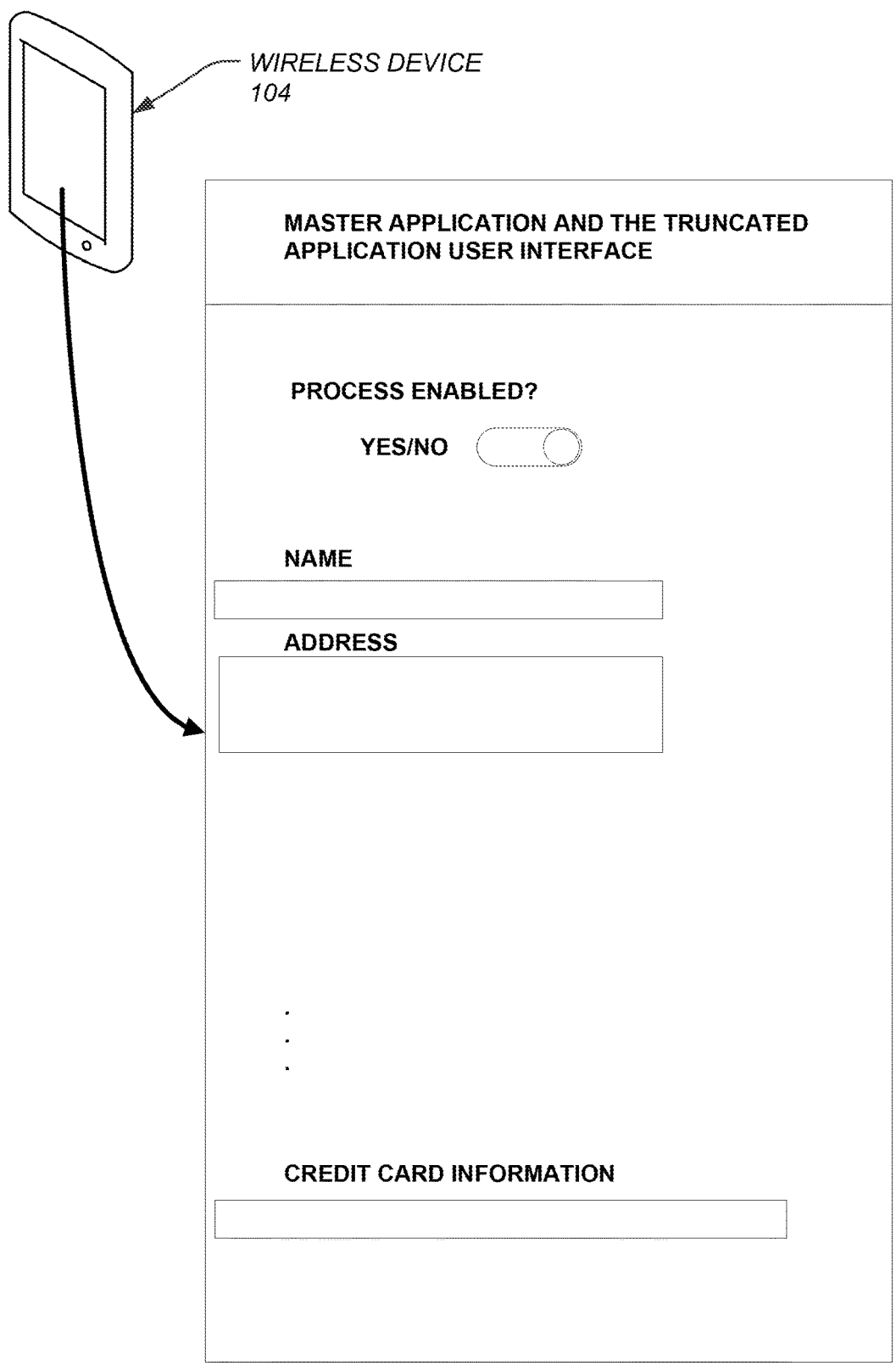
FIG. 6 illustrates an interface of the software program employed for enhancing user experience on an electronic device according to one aspect of the invention.

FIG. 6 illustrates an interface of the software program employed for enhancing user experience on an electronic device according to one aspect of the invention. In particular, the interface may be generated consistent with the process 500.

Figure 7:
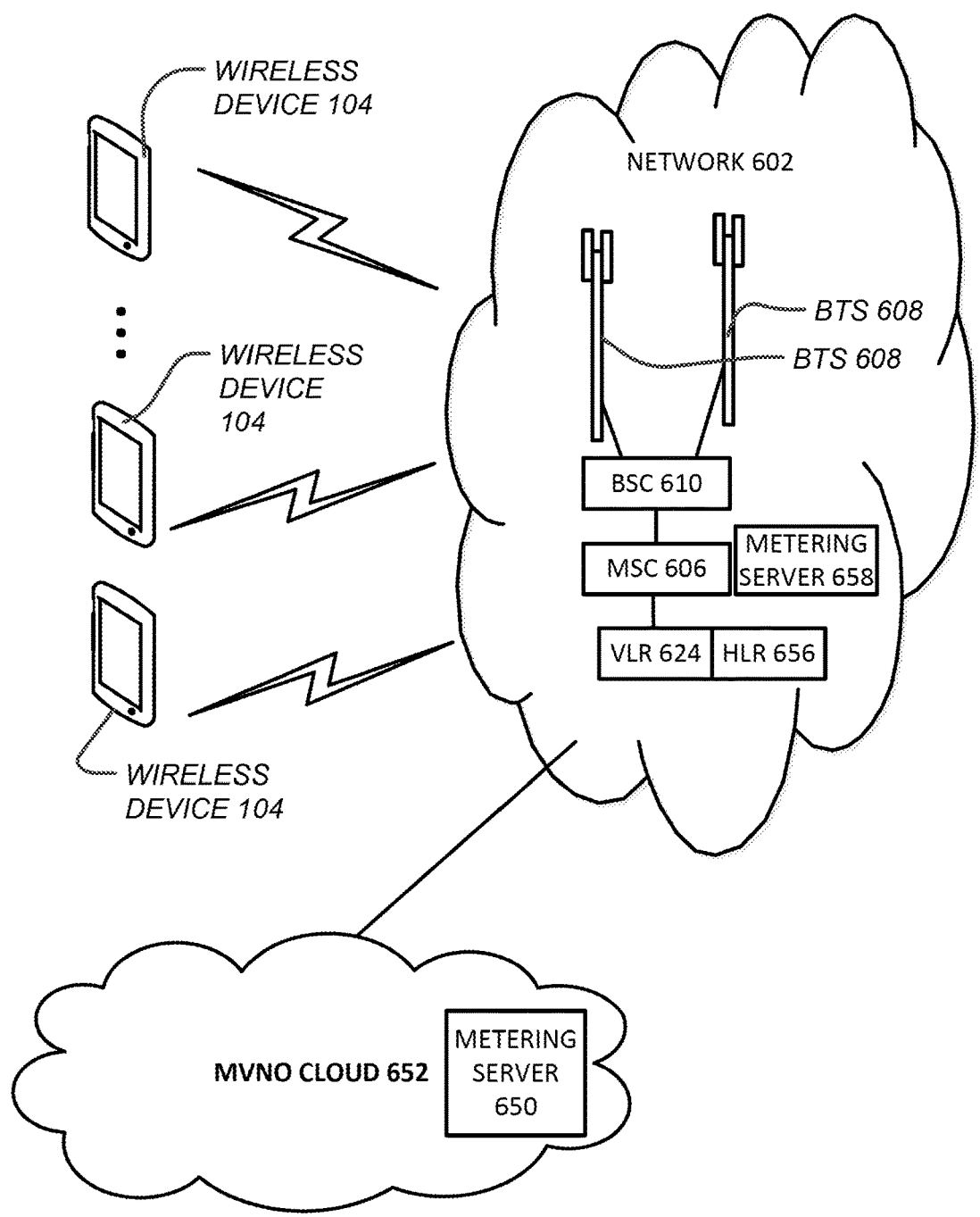
FIG. 7 illustrates a network and an electronic device according to one aspect of the invention.

FIG. 7 illustrates a network and an electronic device according to one aspect of the invention. Electronic devices 104, such as, for example mobile phones, access networks via service providers. Some companies provide postpaid wireless services, such as mobile phone and data service. These providers can be wireless carriers or Mobile Network Operators (MNO) that maintain and control their own wireless networks. An MNO relies heavily on backend systems to address any provisional, billing, security and data issues that might threaten the health of their networks. A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks, minutes of use, volume of data transfer, number of SMS messages, etc. Such services may then be sold to end user, e.g., subscribers. The MNO may include a network 602 having at least one BTS 608, a BSC 610, MSC 606, the VLR

624, HLR 656, and the like. When implemented with an MVNO, a system may include a MVNO cloud 652, a metering server 650 and/or metering server 658, and the like.

In an exemplary aspect, the memory element of the system may include but is not limited to a memory unit, memory device, memory, article; memory medium, storage device, storage article, storage medium and/or storage unit, for example, memory, removable or non-removable media, erasable or non-erasable media, writeable or re-writeable media digital or analog media, hard disk, floppy disk, Compact Disk Read Only Memory (CD-ROM), Compact Disk Recordable (CD-R), Compact Disk Re-Writeable (CD-RW), optical disk; magnetic media, various types of Digital Versatile Disks (DVDs), a tape; a cassette; or the like.

The processor 114 may be a central processing unit configured to execute instructions including instructions related to software programs. The processor 114 may be configured to process call functions, data transfer, and the like and provide other services to the user.

In an exemplary aspect, the processor may be implemented in any type of mobile smartphone that may be operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

In yet another aspect of the application, there is disclosed a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

In yet another exemplary aspect, the computer readable medium stores computer data, which data can include computer program code that is executable by a processor of the SIM or mobile device, in machine readable form. In one or more aspects, the actions and/or events of a method, algorithm or module may reside as one or any combination or set of codes and/or instructions on a computer readable medium or machine readable medium, which may be incorporated into a computer program product. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

In an exemplary aspect of the aspect of the application, there is disclosed a computer readable medium which embodies a program of instructions executable by an electronic device. In one aspect, the electronic device is a smartphone device. The program of instructions is configured so as to perform the steps of improving user experience with one or more truncated applications. The program including the steps of (i) providing instructions for one or more truncated applications for storage in memory of the electronic device; (ii) displaying icons representing said one or more truncated applications on a display of said electronic device; (iii) determining that a user has selected at least one of said truncated applications; and (iv) populating user input fields of said selected one or more truncated applications with user information.

The application may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), 4G-LTE, Wireless Fidelity (Wi-Fi), Bluetooth, and/or the like, and/or a combination of two or more thereof.

In an aspect including a "wireless network", the network may encompass any type of wireless network from which a Mobile Virtual Network Operator (MVNO) contracts with a Mobile Network Operator (MNO) wireless carrier to provide mobile phone services through the use of a wireless device, such as the Global System for Mobile Communication (GSM) network, Code-Division Multiple Access (CDMA) network, a communication channel is defined herein, or the like, that may utilize the teachings of the present application to allow a wireless device to connect to a wireless network.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A method for improving user experience with web-based applications on a wireless device comprising:
   storing instructions for a master application in a memory of the wireless device;
   storing instructions for one or more truncated applications in the memory of the wireless device, wherein the one or more truncated applications lack at least one feature of non-truncated counterparts of the one or more truncated applications, wherein the one or more truncated applications interact with a separate processor to provide increased functionality, and wherein the one or more truncated applications are abbreviated versions of full memory counterparts;

displaying an icon representing the master application on a display of the wireless device;

determining with a wireless device processor that a user has selected the master application by detecting the user interacting with the icon representing the master application in a user interface of an initial screen associated with the display of the wireless device;

executing the instructions for the master application in the wireless device processor in response to the detecting the user interacting with the icon representing the master application in the user interface of the initial screen associated with the display of the wireless device;

implementing an interface to said one or more truncated applications and displaying icons representing said one or more truncated applications on the display of said wireless device in a secondary screen in response to executing the master application in the wireless device processor by the detecting a user interacting with the icon representing the master application on the user interface associated with the display of the wireless device;

determining with a wireless device processor that the user has selected at least one of said truncated applications by detecting the user interacting with the icons representing said one or more truncated applications on the display in the secondary screen of said wireless device with the user interface associated with the display of the wireless device;

executing the instructions for the at least one of said truncated applications in the wireless device processor in response to the detecting the user interacting with the icons representing said one or more truncated applications on the display in the secondary screen of said wireless device with the user interface associated with the display of the wireless device;

displaying user input fields on the display of said wireless device in response to execution by the wireless device processor of the instructions for the at least one truncated application;

accessing a database stored in the memory of the wireless device in response to execution by the wireless device processor of the instructions for the master application, the database storing user information;

communicating and interfacing between the master application and the at least one of said truncated applications by the wireless device processor, the communicating and interfacing between the master application and the at least one of said truncated applications by the wireless device processor comprises communicating and interfacing utilizing an application programming interface protocol, wherein the application programming interface protocol includes rules allowing the master application to interface and/or communicate with the at least one of said truncated applications;

populating with the wireless device processor the user input fields of a selected one or more truncated applications with the user information from the database utilizing the application programming interface protocol in response to the communicating and interfacing between the master application and the at least one of said truncated applications by the wireless device processor, and tracking activity of a usage of the one or more truncated applications by a wireless service provider.

2. The method according to claim 1, further comprising:
generating a prompt on a display of the wireless device prompting the user by the master application to "agree" or "not agree" to automatic population of the user information in the user input fields of said selected one or more truncated applications with the user information from the database, wherein said populating the user input fields of said selected one or more truncated applications with the user information from the database is automatically performed by the wireless device processor after the user agrees to automatic population; and wherein the master application is configured to operate as a portal application.

3. The method according to claim 1, further comprising:
encrypting the database stored in the memory of the wireless device that stores the user information utilizing at least one symmetric encryption key;

generating a prompt on a display of the wireless device prompting said user to confirm the user information provided during said populating the user input fields of said selected one or more truncated applications with the user information from the database; and allowing correction of the user information in the user input fields of said selected one or more truncated applications.

4. The method according to claim 1, further comprising:
the displaying the icon representing the master application on a display of the wireless device comprises displaying the icon representing the master application on an initial screen on the display of the wireless device;

providing instructions for the master application stored in the memory and executed by the wireless device processor to generate a secondary screen on the display of the wireless device, the secondary screen being different from the initial screen; and displaying on the secondary screen on the display of the wireless device the icons of said one or more truncated applications in response to launching the master application.

5. The method according to claim 4,
wherein said user information is retrieved from the database associated with said master application; and wherein the database associated with said master application is encrypted utilizing at least one symmetric encryption key.

6. The method according to claim 4, further comprising:
storing an operating system in the memory; and
encrypting the database stored in the memory of the wireless device that stores the user information utilizing at least one symmetric encryption key, wherein the master application is stored locally in the memory separate from the operating system;

wherein the master application is configured as a portal to the one or more truncated applications.

7. The method according to claim 1, further comprising:
the displaying the icon representing the master application on a display of the wireless device comprises displaying the icon representing the master application on an initial screen on the display of the wireless device;

providing instructions for the master application stored in the memory and executed by the wireless device processor to generate a secondary screen on the display of the wireless device, the secondary screen being different from the initial screen; and displaying on the secondary screen on the display of the wireless device the icons of said one or more truncated applications in response to launching the master application, wherein said user information comprises at least one of the following: first name, last name, middle name, mailing address, business address, social security number, date of birth, citizenship, credit card information, billing address, security questions, user specified preferences, and combinations thereof.

8. The method according to claim 1 further comprising:

displaying a sign-on screen in response to the detecting the user interacting with the icons representing said one or more truncated applications on the display of said wireless device with the user interface associated with the display of the wireless device, wherein the sign-on screen requests specific information from the user to gain full access to the truncated application; and wherein said wireless device is selected from a smartphone, a tablet and a personal digital assistant.

9. The method according to claim 8, further comprising:

encrypting the database stored in the memory of the wireless device that stores the user information utilizing at least one symmetric encryption key;

the displaying the icon representing the master application on a display of the wireless device comprises displaying the icon representing the master application on an initial screen on the display of the wireless device;

providing instructions for the master application stored in the memory and executed by the wireless device processor to generate a secondary screen on the display of the wireless device, the secondary screen being different from the initial screen; and displaying on the secondary screen on the display of the wireless device the icons of said one or more truncated applications in response to launching the master application, wherein said smartphone is a pre-paid phone with wireless network services provided by a mobile virtual network operator; and wherein the master application is configured to operate as a portal application.

10. The method according to claim 1, further comprising:

the displaying the icon representing the master application on a display of the wireless device comprises displaying the icon representing the master application an initial screen on the display of the wireless device;

providing instructions for the master application stored in the memory and executed by the wireless device processor to generate a secondary screen on the display of the wireless device, the secondary screen being different from the initial screen; and displaying on the secondary screen on the display of the wireless device the icons of said one or more truncated applications in response to launching the master application, wherein said one or more truncated applications comprise at least one of the following: calculate/utilities applications, entertainment applications, games applications, news applications, productivity applications, search tool applications, social networking applications, sports applications, travel applications, weather applications, and combinations thereof.

11. A system for improving user interaction of web-based applications on a wireless device comprising:

a memory of the wireless device configured to store instructions for a master application;

the memory of the wireless device configured to store instructions for one or more truncated applications, wherein the one or more truncated applications lack at least one feature of non-truncated counterparts of the one or more truncated applications, wherein the one or more truncated applications interact with a separate processor to provide increased functionality, and wherein the one or more truncated applications are abbreviated versions of full memory counterparts;

a processor on said wireless device operatively coupled to said memory, said processor configured to execute said instructions and execute instructions including:

displaying an icon representing the master application on a display of the wireless device;

determining with a wireless device processor that a user has selected the master application by detecting the user interacting with the icon representing the master application in a user interface of an initial screen associated with the display of the wireless device;

executing the instructions for the master application in the wireless device processor in response to the detecting the user interacting with the icon representing the master application in the user interface of the initial screen associated with the display of the wireless device;

implementing an interface to said one or more truncated applications and displaying icons representing said one or more truncated applications on the display of said wireless device in a secondary screen in response to executing the master application in the wireless device processor by the detecting a user interacting with the icon representing the master application on a user interface associated with the display of the wireless device;

determining with a wireless device processor that the user has selected at least one of said truncated applications by detecting the user interacting with the icons representing said one or more truncated applications on the display in the secondary screen of said wireless device with the user interface associated with the display of the wireless device;

executing the instructions for the at least one of said truncated applications in the wireless device processor in response to the detecting the user interacting with the icons representing said one or more truncated applications on the display in the secondary screen of said wireless device with the user interface associated with the display of the wireless device;

displaying user input fields on the display of said wireless device in response to execution by the wireless device processor of the instructions for the at least one truncated application;

accessing a database stored in the memory of the wireless device in response to execution by the wireless device processor of the instructions for the master application, the database storing user information;

communicating and interfacing between the master application and the at least one of said truncated applications by the wireless device processor, wherein the instructions for the communicating and interfacing between the master application and the at least one of said truncated applications by the wireless device processor comprises communicating and interfacing utilizing an application programming interface protocol, wherein the application programming interface protocol includes rules allowing the master application to interface and/or communicate with the at least one of said truncated applications;

populating with the wireless device processor the user input fields of a selected one or more truncated applications with the user information from the database utilizing the application programming interface protocol in response to the communicating and interfacing between the master application and the at least one of said truncated applications by the wireless device processor; and instructions for tracking activity of a usage of the one or more truncated applications by a wireless service provider.

12. The system according to claim 11,
wherein the processor is further configured to generate a prompt on a display of the wireless device to prompt the user by the master application to "agree" or "not agree" to automatic population of the user information in the user input fields of said selected one or more truncated applications with the user information from the database; and
wherein said populating the user input fields of said selected one or more truncated applications with the user information from the database is automatically performed by the wireless device processor after the user agrees to automatic population.

13. The system according to claim 11,
wherein said instructions further include encrypting the database stored in the memory of the wireless device that stores the user information utilizing at least one symmetric encryption key;
wherein said instructions further include generating a prompt on a display of the wireless device prompting said user to confirm the user information provided during said populating the user input fields of said selected one or more truncated applications with the user information from the database; and
wherein said instructions further include allowing correction of the user information in the user input fields of said selected one or more truncated applications.

14. The system according to claim 11, wherein said instructions further include:
encrypting the database stored in the memory of the wireless device that stores the user information utilizing at least one symmetric encryption key;
the displaying the icon representing the master application on a display of the wireless device comprises displaying the icon representing the master application on an initial screen on the display of the wireless device;
providing protocol for the master application stored in the memory and executed by the wireless device processor to generate a secondary screen on the display of the wireless device, the secondary screen being different from the initial screen; and
displaying on the secondary screen on the display of the wireless device the icons of said one or more truncated applications in response to launching the master application,
wherein the master application is configured to operate as a portal application.

15. The system according to claim 14,
wherein said user information is retrieved from the database associated with said master application; and
wherein the database associated with said master application is encrypted utilizing at least one symmetric encryption key.

16. The system according to claim 14, further comprising an operating system stored in the memory,
encrypting the database stored in the memory of the wireless device that stores the user information utilizing at least one symmetric encryption key,
wherein the master application is stored locally in the memory separate from the operating system; and
wherein the master application is configured as a portal to the one or more truncated applications.

17. The system according to claim 11, further comprising:
the instructions for displaying the icon representing the master application on a display of the wireless device comprises displaying the icon representing the master application on an initial screen on the display of the wireless device;
instructions for the master application stored in the memory and executed by the wireless device processor to generate a secondary screen on the display of the wireless device, the secondary screen being different from the initial screen; and
instructions for displaying on the secondary screen on the display of the wireless device the icons of said one or more truncated applications in response to launching the master application,
wherein said user information comprises at least one of the following: first name, last name, middle name, mailing address, business address, social security number, date of birth, citizenship, credit card information, billing address, security questions, user specified preferences, and combinations thereof.

18. The system according to claim 11 further comprising:
displaying a sign-on screen in response to the detecting the user interacting with the icons representing said one or more truncated applications on the display of said wireless device with the user interface associated with the display of the wireless device,
wherein the sign-on screen requests specific information from the user to gain full access to the truncated application; and
wherein said wireless device is selected from a smartphone, a tablet and a personal digital assistant.

19. The system according to claim 18, further comprising:
instructions for encrypting the database stored in the memory of the wireless device that stores the user information utilizing at least one symmetric encryption key;
the instructions for displaying the icon representing the master application on a display of the wireless device comprises displaying the icon representing the master application on an initial screen on the display of the wireless device;
instructions for the master application stored in the memory and executed by the wireless device processor to generate a secondary screen on the display of the wireless device, the secondary screen being different from the initial screen; and
instructions for displaying on the secondary screen on the display of the wireless device the icons of said one or more truncated applications in response to launching the master application,
wherein said smartphone is a pre-paid phone with wireless network services provided by a mobile virtual network operator; and
wherein the master application is configured to operate as a portal application.

20. A method for improving user experience with web-based applications on a wireless device comprising:

storing instructions for a master application in a memory of the wireless device;

storing instructions for one or more truncated applications in the memory of the wireless device, wherein the one or more truncated applications lack at least one feature of non-truncated counterparts of the one or more truncated applications, wherein the one or more truncated applications interact with a separate processor to provide increased functionality, and wherein the one or more truncated applications are abbreviated versions of full memory counterparts;

storing an operating system in the memory;

displaying an icon representing the master application on a display of the wireless device;

determining with a wireless device processor that the user has selected the master application by detecting the user interacting with the icon representing the master application in a user interface of an initial screen associated with the display of the wireless device;

executing the instructions for the master application in the wireless device processor in response to the detecting the user interacting with the icon representing the master application in the user interface of the initial screen associated with the display of the wireless device;

implementing an interface to said one or more truncated applications and displaying icons representing said one or more truncated applications on the display of said wireless device in a secondary screen in response to executing the master application in the wireless device processor by detecting a user interacting with the icons representing said one or more truncated applications on the display of said wireless device with the icon representing the master application on a user interface associated with the display of the wireless device;

executing the instructions for the at least one of said one or more truncated applications in the wireless device processor in response to the detecting the user interacting with the icons representing said one or more truncated applications on the display in the secondary screen of said wireless device with the user interface associated with the display of the wireless device;

displaying user input fields on the display of said wireless device in response to execution by the wireless device processor of the instructions for the at least one or more truncated applications;

determining with a wireless device processor that the user has selected at least one of said one or more truncated applications by detecting the user interacting with the user interface associated with the display of the wireless device;

accessing a database stored in the memory of the wireless device in response to execution by the wireless device processor of the instructions for the master application, the database storing user information;

communicating and interfacing between the master application and the at least one of said one or more truncated applications by the wireless device processor;

populating with the wireless device processor user input fields of a selected one or more truncated applications with the user information from the database utilizing an application programming interface protocol in response to the communicating and interfacing between the master application and the at least one of said truncated applications by the wireless device processor;

displaying the icon representing the master application on a display of the wireless device comprises displaying the icon representing the master application on an initial screen on the display of the wireless device;

providing instructions for the master application stored in the memory and executed by the wireless device processor to generate a secondary screen on the display of the wireless device, the secondary screen being different from the initial screen;

displaying on the secondary screen on the display of the wireless device the icons of said one or more truncated applications in response to launching the master application; and tracking activity of a usage of the one or more truncated applications by a wireless service provider, wherein the communicating and interfacing between the master application and the at least one of said one or more truncated applications by the wireless device processor comprises communicating and interfacing utilizing an application programming interface protocol, wherein the application programming interface protocol includes rules allowing the master application to interface and/or communicate with the at least one of said truncated applications;

wherein said user information is retrieved from the database associated with said master application;

wherein the database associated with said master application is encrypted;

wherein the master application is stored locally in the memory separate from the operating system;

wherein the master application is configured as a portal to the one or more truncated applications;

wherein said master application is configured such that an application programming interface protocol is employed to communicate with said one or more truncated applications; and wherein said wireless device is selected from a smartphone, a tablet and a personal digital assistant.

* * * * *